United States Patent [19]

Lundvik et al.

[11] 3,939,867

[45] Feb. 24, 1976

[54] VALVE FOR COMPRESSORS

[75] Inventors: Bertil Lundvik, Norrkoping; Nils-Arne Johansson, Aby, both of Sweden

[73] Assignee: Stal-Refrigeration AB, Norrkoping, Sweden

[22] Filed: July 25, 1972

[21] Appl. No.: 275,074

[30] Foreign Application Priority Data

Aug. 2, 1971 Sweden................................ 9844/71

[52] U.S. Cl. .......... 137/514; 137/512.15; 137/525.3
[51] Int. Cl.² .......................................... F16K 15/00
[58] Field of Search............. 137/512.15, 512.4, 525, 137/525.3, 525.5, 525.7, 514; 251/284, 285; 417/313

[56] References Cited
UNITED STATES PATENTS

| | | | |
|---|---|---|---|
| 1,892,711 | 1/1933 | Summers | 137/512.15 X |
| 1,963,684 | 6/1934 | Shimer | 137/514 X |
| 2,118,356 | 5/1938 | Money | 137/525.5 |
| 2,335,311 | 11/1943 | Reisner | 251/129 X |
| 2,345,380 | 3/1944 | Kirk | 137/514 X |
| 3,200,838 | 8/1965 | Sheaffer | 137/512.15 |

*Primary Examiner*—C. J. Husar
*Assistant Examiner*—Edward Look
*Attorney, Agent, or Firm*—Eric Y. Munson

[57] ABSTRACT

A valve structure for compressors or the like comprising a flexible valve body normally seated over an exhaust aperture in the compressor and a valve catcher connected jointly with the valve body at one end to a valve plate and extending at an angle above and along the length of the valve body, the valve catcher having a recess in which a layer of resilient material is seated to permit the valve body to flex away from the exhaust aperture along a gradually increasing curve in response to excessive pressure.

5 Claims, 3 Drawing Figures

VALVE FOR COMPRESSORS

BACKGROUND OF THE INVENTION

The present invention relates to a valve for a compressor arranged on a valve plate on the compressor. The valve is of the type which covers an aperture in the valve plate with a corresponding laminated valve body, the valve body being supported by a valve catcher in the form of a curved plate which is attached, together with the valve body, to the valve plate by means of at least one screw. This type of valve is rather usual in cooling compressors.

As mentioned, the valve body is laminated and usually consists of one or more thin plates of spring steel. In order to ensure a gradual deformation of the valve body, this is covered by a valve catcher. The aperture in the valve plate usually comprises several slots, the valve body as well as the catcher being divided into a corresponding number of fingers.

Even though the valve catcher and the attachment of the valve body are carefully constructed, the life of the latter will not be satisfactorily long. This is a problem, particularly with cooling compressors which must be able to operate automatically without any maintenance for long periods. The fault is caused either because the curve of the valve body is concentrated in one area or a few small areas where the material becomes fatigued and cracks, or because the material becomes fatigued and cracks as a result of repeated impact.

In order to remedy this, it is proposed according to the invention to coat the under side of the valve catcher with an elastic material, preferably plastic or rubber so that there is less strain on the valve body. At the same time, this considerably dampens the noise from the valve in operation. The valve according to the invention is described in the following specification and defined in the accompanying claims.

It is obvious that the elastic coating on the valve catcher must be of a material which will tolerate both the compressor oil and the operating medium of the compressor, for example a coolant. Teflon has proved to be suitable in this respect.

BRIEF DESCRIPTION OF THE DRAWINGS

The invention will be further described with reference to the accompanying drawings in which FIG. 1 shows a section through a valve according to the invention, while

Figure 1:
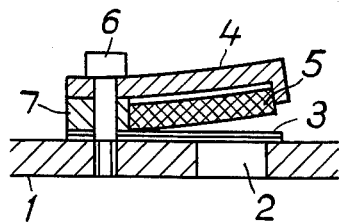

The valve rests on a valve plate 1 having an aperture or slots 2, above which is a valve body 3. The valve body usually consists of at least one thin layer of steel. The movement of the valve body is guided by a curved valve catcher 4 having an elastic coating 5 on the under side, preferably of teflon, to ensure a gradual curve of the valve body 3 and to dampen the impact. The valve body and the valve catcher are attached to the valve plate by means of one or more screws 6, a spacer 7 being fitted over the screws between the valve body and the valve catcher.

Figure 2:
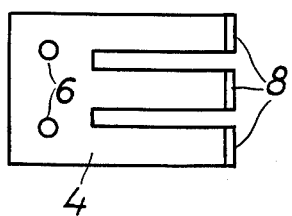
FIG. 2 shows the valve seen from above.

FIG. 2 shows the valve seen from above and it can be seen that the valve catcher 4 is divided into fingers 8. If the apertures 2 in the valve plate are in the form of slits, the valve body 3 should also be divided in a corresponding manner.

Figure 3:
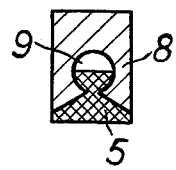
FIG. 3 shows a section through one finger of a valve catcher.

FIG. 3 shows a section through one finger 8 of the valve body where it can be seen how the coating 5 is designed with a dovetail inserted in a corresponding groove 9 in the finger 8. As shown in FIG. 1, the groove 9 is suitably closed at its outer end so that the coating 5 is inserted in the groove from the inside, after which the coating is kept in position by the spacer 7.

As can be seen from FIG. 3, the dovetail should not entirely fill the groove 9, but there should be space to allow the coating material to swell slightly in the groove. Furthermore, the edges of the finger 8 are suitably slightly bevelled, as shown, and thus the coating 5 is correspondingly thicker in the middle than at the edges so that it is firmly guided. In this way the coating is well embedded on all sides and can expand and shrink without risk of falling out.

We claim:

1. In a valve having a valve plate defining an aperture, a flexible longitudinally extending valve body normally seated and connected at one end thereof to the valve plate over the aperture, a longitudinally extending valve catcher connected at said one end thereof to the valve plate, the valve catcher being positioned above the valve body and curving away from the valve body, and the valve catcher acting as a limiting support for the valve body when the latter is flexed, the improvement in the valve catcher providing a gradual curve of the valve body when flexed and reducing the strain therein while dampening the valve body impact and operation noise, comprising a layer of resilient material retained by said valve catcher and extending along the entire length of the valve catcher portion positioned over the length of the flexible portion of the valve body, the resilient layer being positioned to permit the valve body to flex away from the aperture along a gradually increasing curve in response to increased pressure.

2. The improved valve as claimed in claim 1 wherein the valve catcher portion positioned over the length of the flexible portion of the valve body has a recess extending along the portion length and a portion of the resilient material layer is seated in the recess.

3. An improved valve according to claim 2, in which said portion of resilient material is dovetailed in said recess.

4. An improved valve according to claim 3, in which said dovetailed portion fills only a portion of said recess.

5. An improved valve according to claim 2 in which the edges defining the opening of said recess and said portion of resilient material are bevelled.

* * * * *